United States Patent
Spencer

(10) Patent No.: US 7,263,712 B2
(45) Date of Patent: Aug. 28, 2007

(54) ENABLING A PC-DTV RECEIVER TO SHARE THE RESOURCE CACHE WITH MULTIPLE CLIENTS

(75) Inventor: Robert L. Spencer, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 1139 days.

(21) Appl. No.: 09/870,100

(22) Filed: May 29, 2001

(65) Prior Publication Data
US 2002/0184624 A1    Dec. 5, 2002

(51) Int. Cl.
H04N 7/173    (2006.01)
H04N 7/16    (2006.01)

(52) U.S. Cl. ............... 725/112; 725/51; 725/131; 725/133; 725/151

(58) Field of Classification Search ............ 725/32, 725/34, 80, 85, 112, 131, 133, 139, 141, 136, 725/151, 153, 57
See application file for complete search history.

(56) References Cited

U.S. PATENT DOCUMENTS

| | | |
|---|---|---|
| 5,111,306 A | 5/1992 | Kanno et al. |
| 5,307,055 A | 4/1994 | Baskin et al. |
| 5,347,304 A | 9/1994 | Moura et al. |
| 5,499,046 A | 3/1996 | Schiller et al. |
| 5,510,844 A | 4/1996 | Cash et al. |
| 5,513,180 A | 4/1996 | Miyake et al. |
| 5,519,433 A | 5/1996 | Lappington et al. |
| 5,526,023 A | 6/1996 | Sugimoto et al. |
| 5,594,491 A | 1/1997 | Hodge et al. |
| 5,613,192 A | 3/1997 | Ikami et al. |
| 5,671,267 A | 9/1997 | August et al. |
| 5,715,020 A | 2/1998 | Kuroiwa et al. |
| 5,818,441 A | 10/1998 | Throckmorton et al. |
| 5,831,664 A | 11/1998 | Wharton et al. |
| 6,072,483 A * | 6/2000 | Rosin et al. ............ 715/716 |
| 6,249,914 B1 * | 6/2001 | Harrison et al. ......... 725/141 |
| 6,281,790 B1 * | 8/2001 | Kimmel et al. .......... 340/506 |
| 6,721,780 B1 * | 4/2004 | Kasriel et al. ........... 709/203 |
| 6,879,808 B1 * | 4/2005 | Nations et al. ......... 455/12.1 |
| 6,938,270 B2 * | 8/2005 | Blackketter et al. ...... 725/112 |
| 7,047,305 B1 * | 5/2006 | Brooks et al. ........... 709/231 |
| 2004/0255326 A1 * | 12/2004 | Hicks et al. ............... 725/81 |
| 2005/0028208 A1 * | 2/2005 | Ellis et al. ................. 725/58 |

OTHER PUBLICATIONS http://www.webtv.com/company/press/archive/adrelease.html; Internet article printed Jan. 4, 2001.
http://www.telefusion.com/xoverlinks/; Internet article printed Jan. 4, 2001.
http://www.webtv.net/ns/tune/homepage/plus_links.html; Internet article printed Jul. 22, 1998.

* cited by examiner

Primary Examiner—Kieu-Oanh Bui
(74) Attorney, Agent, or Firm—Molly McCall

(57) ABSTRACT

A digital broadcast signal is received to a digital television receiver in a computer. The digital broadcast signal is processed to extract enhanced content data. The enhanced content data is stored in a web browser cache. The web browser cache is interrogated with an application programming interface. Responsive to the application programming interface interrogating the web browser cache, the enhanced content data is provided to a personal web server. The enhanced content data in the personal web server is stored and providing to at least one client device.

29 Claims, 6 Drawing Sheets

ENABLING A PC-DTV RECEIVER TO SHARE THE RESOURCE CACHE WITH MULTIPLE CLIENTS

BACKGROUND OF THE INVENTION

1. Field of the Invention

The present invention relates generally to communication systems, and in particular, relates to digital broadcast systems.

2. Background Information

The television broadcasting industry is expanding into digital broadcast technologies that promise new features, higher resolution video and audio, and other technological enhancements. Digital television (DTV) broadcasting provides several advancements in broadcast content enhancement. One type of content enhancement is the addition of supplemental information to the regular broadcast transmission. Supplemental information can take many forms such as hypertext markup language (HTML), meta-data, and other information carrying data structures. Enhanced or interactive television incorporates the broadcast supplemental information into the viewing experience through interactive displays, links to Internet pages and other features.

The Advanced Television Enhancement Forum (ATVEF) has published the Enhanced Content Specification, version 1.1, revision 26, 1998-1999 (hereinafter refered to as "ATVEF specification") to promote consistent methods for providing enhancements in both analog and digital broadcasting enhancements. The ATVEF specification provides standards for the transmission and processing of triggers, resources, anouncements and content that are associated with an enhanced television transmission. Such enhancements are often suitable for use by a computer connected to the Internet. For example, one type of supplemental information is a Universal Resource Locator (URL) to a television network's website where additional programming information can be acquired.

Convergence of consumer electronics such as televisions and video cassette recorders (VCRs) provide convenience to consumers. The personal computer (PC), now a vital part of many homes is also enjoying convergence with other electronic devices. One such integration is with a broadcast television receiver, so that the computer may be used as a television or for enhanced television broadcasting. Integration of DTV broadcast television reception with a personal computer is made possible by including a DTV receiver card in the computer. Personal computer users therefore may benefit from enhanced DTV broadcasts for both viewing of programs and for shopping online and other Internet experiences that may be tied to the enhanced content provided with the broadcast signal. It is necessary to have a digital broadcast receiver to enjoy the many enhancements of digital broadcasting. Generally, a television receiver is required of every computer or electronic device that might benefit from enhanced resources available from an enhanced digital television broadcast.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of a system and method for enabling a personal computer DTV receiver to share a resource cache with multiple clients are described herein. In the following description, numerous specific details are provided, such as such as illustrated in FIGS. 1-5, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Wherever possible like numbers refer to like elements in the figures.

In summary and as detailed below, a digital broadcast signal is first received by a digital television receiver in a computer. The digital broadcast signal is then processed to extract enhanced content data. The enhanced content data is then stored in a web browser cache. The web browser cache is then interrogated with an application programming interface. Responsive to the application programming interface interrogating the web browser cache, the enhanced content data is next provided to a personal web server. The enhanced content data in the personal web server is first stored and then provided to at least one client device.

Figure 1:
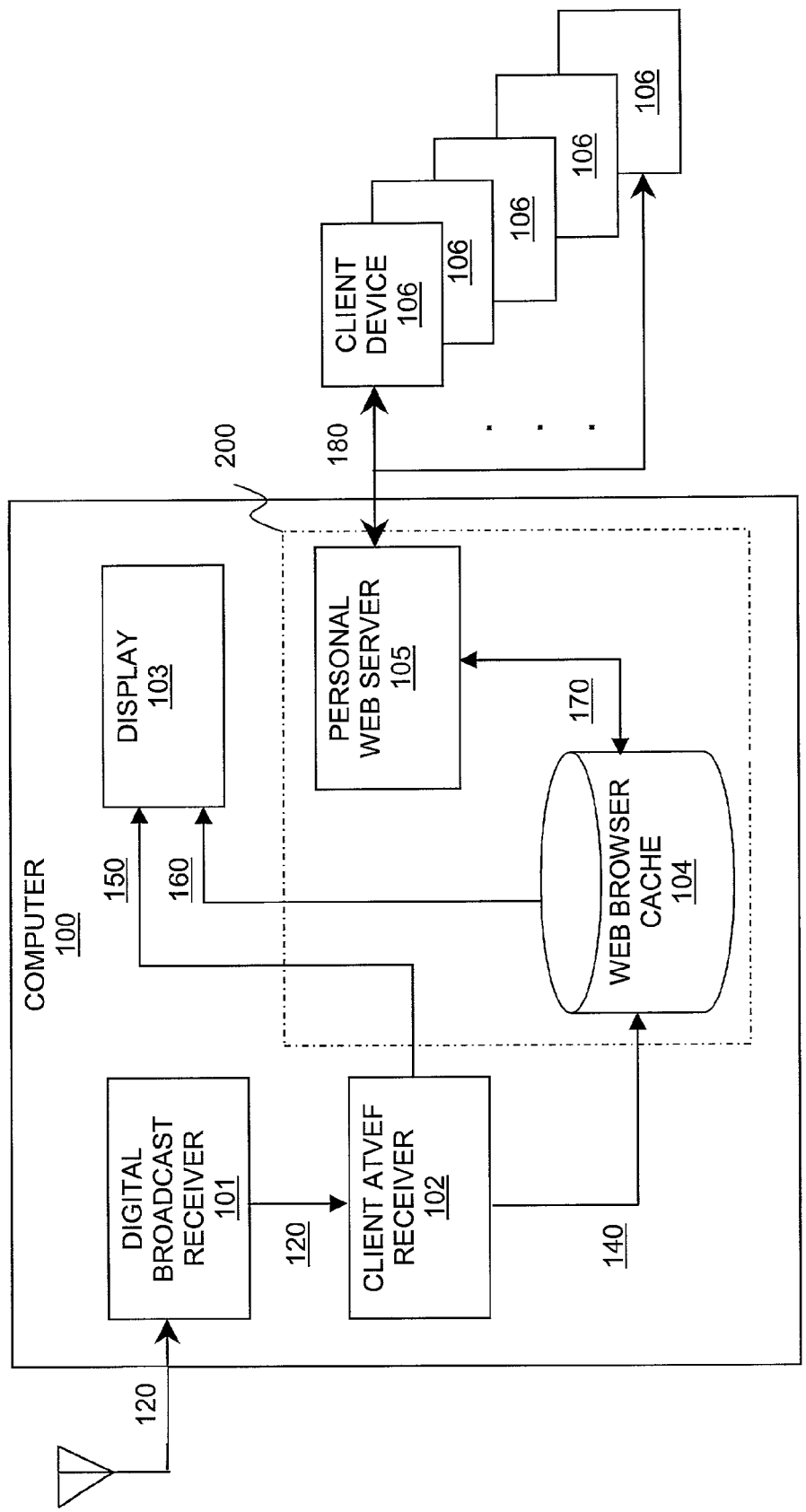
FIG. 1 illustrates a computer system with a personal web server in an embodiment of the invention.

FIG. 1 illustrates a computer system with a personal web server in an embodiment of the invention. FIG. 1 shows a computer 100 with installed components. Computer 100 is generally a personal computer, but may be any computer, server or device containing a processor, memory, data storage, a data bus and communication devices.

A digital broadcast receiver 101 is installed in computer 100. Digital broadcast receiver 101 is generally self-contained and designed for installation in a personal computer to receive digital television broadcasts (DTV). A DTV broadcast signal 120 is capable of being received by digital broadcast receiver 101. DTV broadcast signal 120 may be received via an antenna as depicted in FIG. 1, or via cable, satellite dish, or any other suitable means.

A client ATVEF receiver 102 is connected to the digital broadcast receiver 101. Generally, client ATVEF receiver 102 is a software product running in computer 100, but may also be a hardware device installed into computer 100. The client ATVEF receiver 102 processes the DTV broadcast signal 120 to extract enhanced content in accordance with the ATVEF specification. Extraction of enhanced content may be the stripping of triggers, executing a script, segregating data or data structures or other methods of separating data into groupings. Enhanced content extracted from DTV broadcast signal 120 may include a variety of enhanced television resources such as ATVEF triggers to update information displayed on a visual display, Universal Resource Locators (URLs), metadata, scripts, java applets and other useful data.

Computer 100 also includes a display 103. Display 103 is generally a visual display device capable of receiving commands from a computer such as computer 100, and displaying text, pictures, motion video, etc. Display 103 receives enhanced content data 150 from client ATVEF receiver 102 extracted from the DTV broadcast signal 120. Enhanced content data 150 generally includes triggers and announcements that synchronize the content on the display 103 with the content of the DTV broadcast signal 120. Enhanced broadcasts may use triggers and scripts to change the banners on web pages to tie in with a television program or to change web pages, for example.

Computer 100 also includes a web browser cache 104. Generally, web browser cache 104 stores web pages downloaded from the Internet for later viewing. Universal Resource Locators (URLs), java applets or other types of data may also be stored in web browser cache 104. All broadcast signal enhanced resources 140 received by ATVEF receiver 102 are stored in web browser cache 104. Web browser cache 104 provides the stored data 160 to the computer display 103 whenever a previously viewed web page or other stored content is requested by a system user, generally by clicking a pointing device on a hypertext link. Web browser cache 104 generally has enough capacity to hold all of the enhanced content.

Computer 100 includes a personal web server 105. Generally, personal web server 105 is a software product running on computer 100, but may also be a hardware device capable of performing web server functions. A web server, such as personal web server 105, hosts web pages and other data. Personal web server 105 hosts all of the enhanced resources 170 stored in web browser cache 104, including URL's, hypertext markup language (HTML) and metadata received by client ATVEF receiver 102 and any downloaded web pages. The web pages and data hosted by personal web server 105 may be accessed by any device with a web browser as if the device was directly connected to the resources through the Internet, even if the device has no Internet connection. Connected devices therefore, may utilize the resources hosted by personal web server 105 without requiring data on the origin of the resources.

FIG. 1 further includes one or more client devices 106 connected to computer 100. One or more client devices 106 are connected to computer 100 through a network or with a direct connection. Client device 106 is generally a second computer having a visual display, but may be any electronic device having a visual display suitable for connection to computer 100 such as a Personal Digital Assistant (PDA), a remote control, an interactive tablet, an Internet appliance, or another electronic device. Client device 106 may access resources 180 from personal web server 105. Resources 180 echo the enhanced content data 150 sent to display 103, thereby synchronizing client device 106 with display 103 and the program content of DTV broadcast signal 120. Client device 106 may therefore enjoy the benefit of the enhanced resources 180 available from digital broadcast signal 120 without requiring a digital broadcast receiver 101, or extensive memory and/or processing capability within the client device 106.

Figure 2:
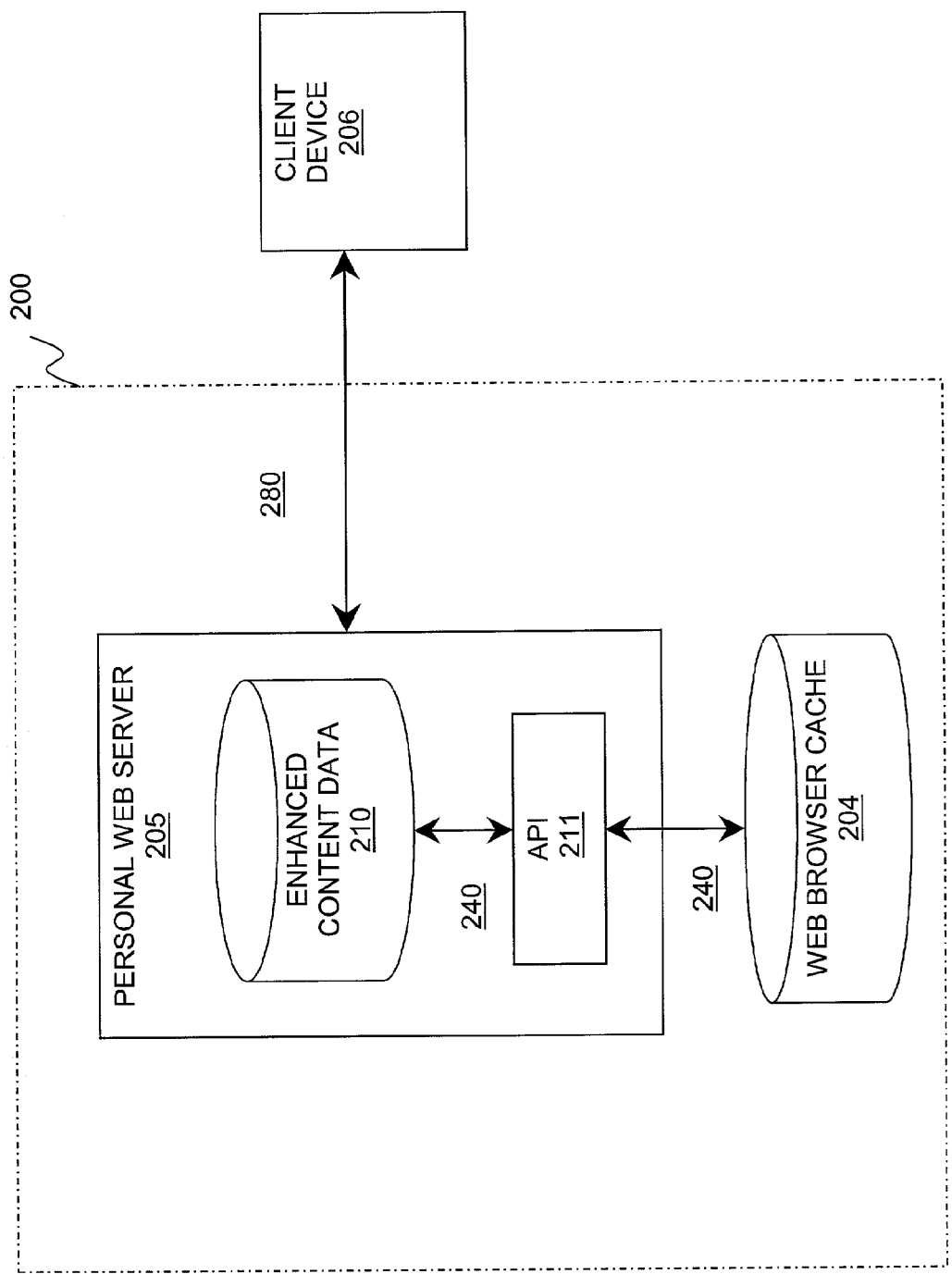
FIG. 2 illustrates in detail a personal web server in an embodiment of the invention.

FIG. 2 illustrates in detail a personal web server in an embodiment of the invention. FIG. 2 contains personal web server 205 connected to a web browser cache 204 as in 200 of FIG. 1. FIG. 2 also contains a client device 206 connected to the personal web server 205. Client device 206 may access enhanced content data 280 from personal web server 205 periodically based upon a predetermined configuration. Personal web server 205 contains an enhanced content database 210 and an application programming interface (API) 211. API 211 may be any suitable operating system level interface used to communicate data or objects between applications. The API 211 is operative to interrogate web browser cache 204 on a periodic basis to request updated enhanced content as it becomes available. The timing of API 211 interrogation is preset at the time of the system configuration. The enhanced content database 210 is updated by API 211 whenever new enhanced content 280 is available. Personal web server 205 functions as a substitute for a direct Internet connection for any connected client device. Since new resources 240 are obtained by the personal web server 205 through API 211 on a constant basis, a client device 206 has access to all enhanced resources 240 available to a host computer such as computer 100 of FIG. 1.

Figure 3:
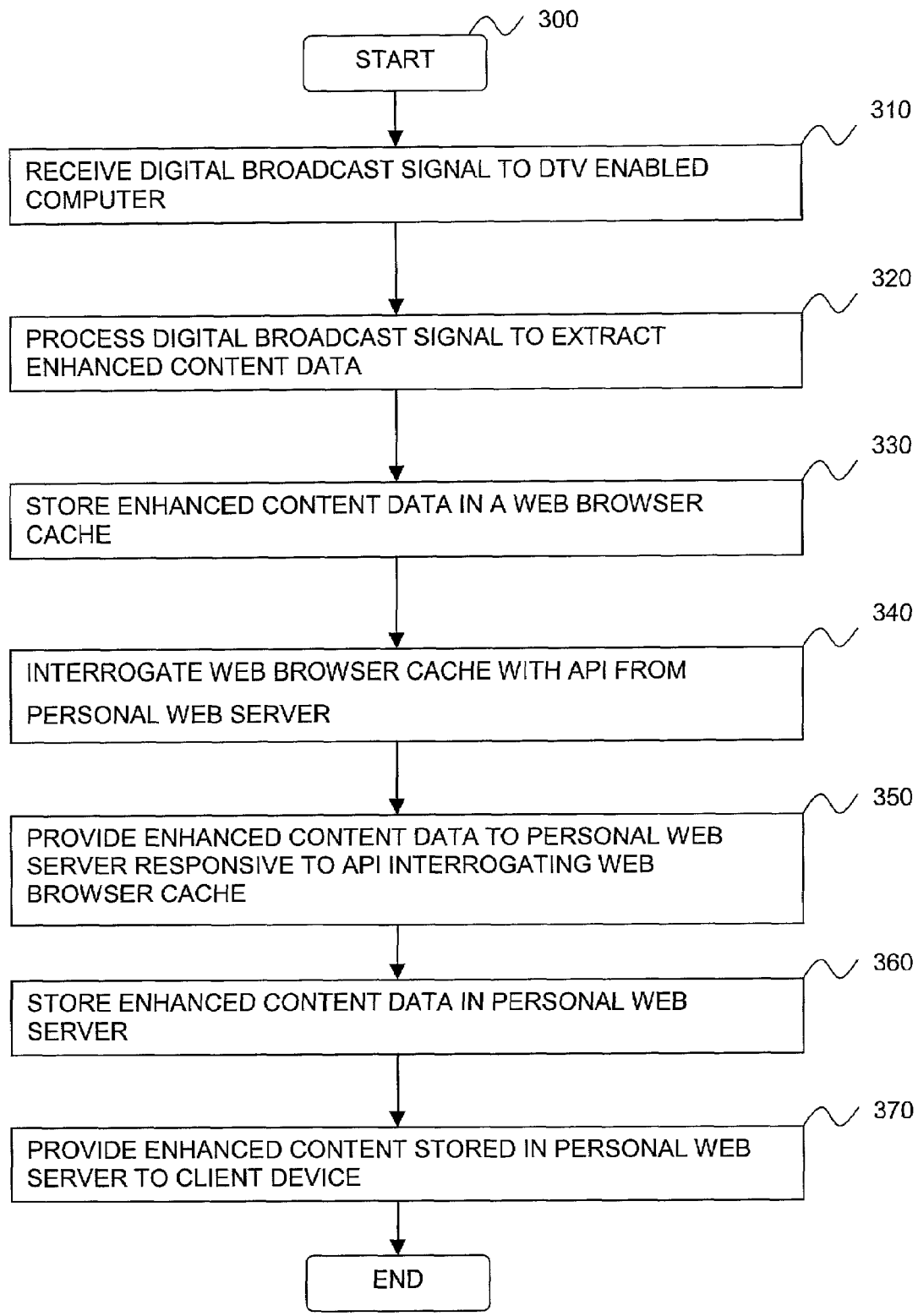
FIG. 3 is a diagram illustrating a process for enabling a PC-DTV receiver to share a resource cache with multiple clients.

FIG. 3 is a diagram illustrating a process for enabling a PC-DTV receiver to share a resource cache with multiple clients. Process 300 begins in step 310. A DTV enabled computer, such as computer 100 of FIG. 1, receives a digital television broadcast signal 120 in step 310. The DTV broadcast signal may be received via a cable, an antenna or any suitable means. A DTV receiver is installed in the computer and capable of receiving and interpreting the DTV signal. The received digital broadcast signal is processed in step 320 by an ATVEF receiver 101 to extract enhanced content data 140. The enhanced content data 140 may include metadata, Universal Resource Locators (URLs), java applets, triggers or other data. The ATVEF specification defines data types, and the corresponding instructions to segregate and extract the enhanced data from the broadcast signal. Generally, the extraction process occurs as the signal is received, with data buffering as needed.

In step 330, the extracted enhanced data 140 is stored in a web browser cache, such as web browser cache 204 of FIG. 2. A web browser cache may hold data in varying forms, such as hypertext markup language (HTML), sound files, photographic files, etc. In step 340, an API 211 interrogates the web browser cache 204 from a personal web server 205. Generally, an application programming interface operates between the operating system and an application to exchange data, commands or functions. A socket layer API such as transmission control protocol internet protocol (TCP/IP) communicates a request for present status to the web browser cache 204. The status of the web browser cache is either no change since the last interrogation, or new data is available. The timing of the interrogation cycle is either predetermined by the platform developer or may be designated by a system user, but in either case is usually frequent enough to be transparent to a system user. Using the API 211 the personal web server 205 may request new data when the status reflects new data in the web browser cache 204 since the last interrogation.

In step 350, an enhanced content database 210 is provided with enhanced data 140 responsive to step 340. The API 211 interrogating the web browser cache 204 requests all new data 240 with each interrogation to the web browser cache 204. The API returns new data 240 to the personal web server through a socket whenever the status of the web browser cache 204 reflects new data. Automated data transfers and updates using an API are well known in the art, and will not be further described.

In step 360, the enhanced data 240 is stored in enhanced content database 210. The API 211 returns new data 240 to the personal web server 205 for storage in database 210. Generally, database 210 is simply another web browser cache like web browser cache 204, for example. Once data such as a web page is stored in database 210 it may be accessed by any device connected to the personal web server, such as device 206 for example.

In step 370, the enhanced data 240 stored in the enhanced content database 210 is provided to a client device 206. A client device 206 connected to the personal web server 205 may access the content stored in the database 210 through an HTML page request from a web browser. Methods for requesting and receiving HTML pages are well known in the art and will not be further detailed.

Figure 4:
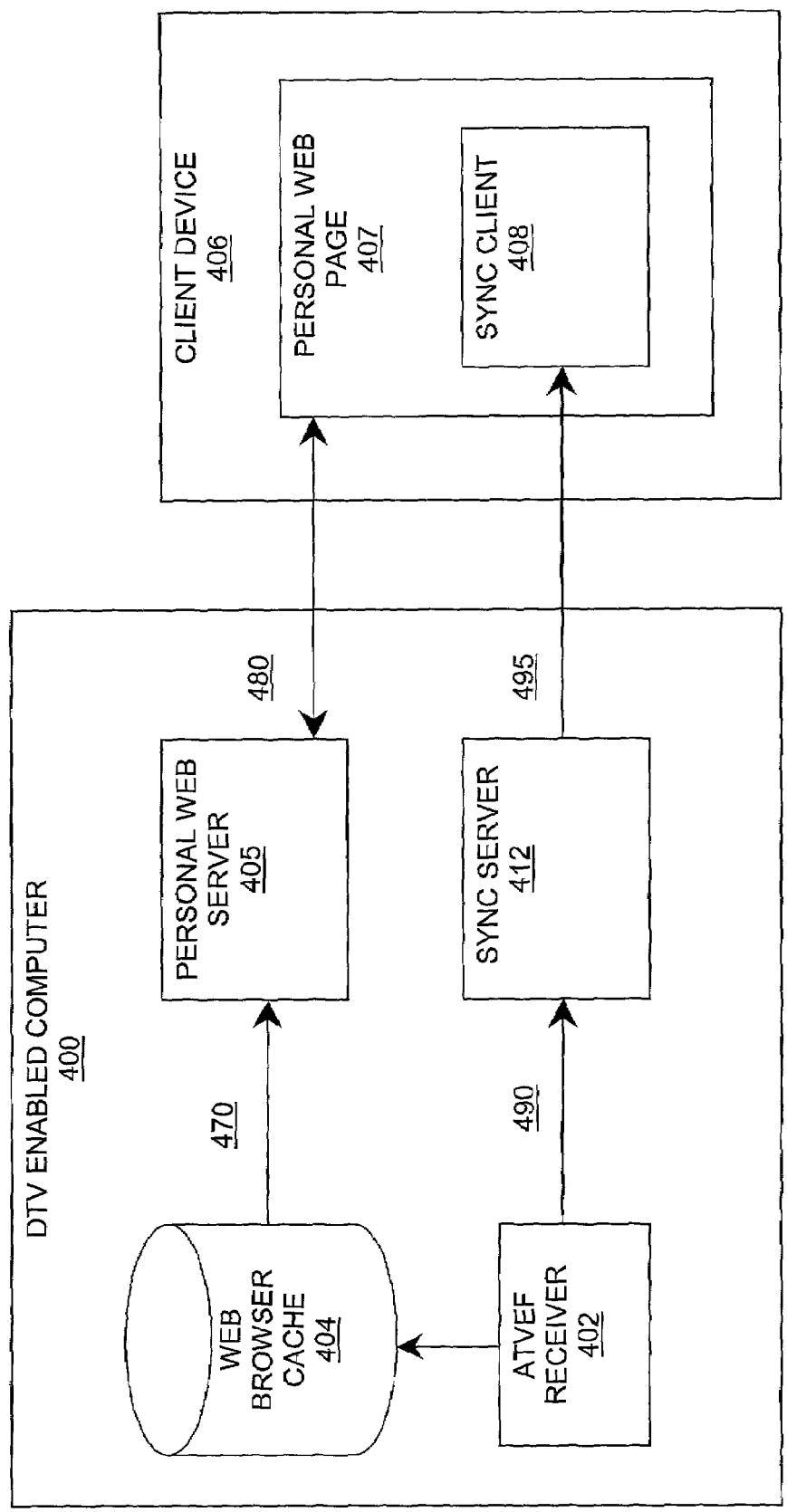
FIG. 4 illustrates a DTV enabled computer with a personal web server and a synchronization server in an embodiment of the invention.

FIG. 4 illustrates a DTV enabled computer with a personal web server and a synchronization server in an embodiment of the invention. FIG. 4 contains a DTV enabled computer 400, as in computer 100 of FIG. 1. A DTV enabled computer is any computer capable of receiving and displaying a digital television broadcast, usually by means of a DTV receiver unit installed in the computer. Computer 400 contains an ATVEF receiver 402, a web browser cache 404 and a personal web server 405 as in FIG. 1. Other components of computer 100 as illustrated in FIG. 1 are omitted for clarity but are assumed present and operative in computer 400. Computer 400 also contains a synchronization server 412. The synchronization server 412 is generally a software program running on computer 400, but may also be a hardware device. When launched or instantiated, synchronization server 412 establishes itself as a notification sink with ATVEF receiver 402 so that all ATVEF synchronization triggers 490 received to computer 400 will be forwarded to the synchronization server 412 where they are stored in a cache and multicast to known network addresses.

FIG. 4 contains a client device 406 connected to computer 400 by a network or a direct connection through a network port. The client device is capable of viewing HTML web pages on a display. A user of client device 406 navigates to a personal web page 407 hosted on the personal web server 405. The personal web page 407 is a home page for the personal web server 405. When the personal web page 407 is loaded to the client device 406, a synchronization client 408 is created as an object window in the personal web page 407. The synchronization client 408 monitors the network port of the client device for the appearance of data 495 multicast from the synchronization server 412. The monitoring of the network port generally is a periodic status check to determine if a receive bit indicates data reception. The synchronization client 408 then updates the synchronization client 408 window based upon data 495 received from the synchronization server 412. Data 495 are generally datagram packets communicated using a socket layer protocol such as transmission control protocol internet protocol (TCP/IP). Datagram packets, and methods for communicating datagram packet, such as multicasting, are well known in the art and will not be further described.

Data 495 generally will include ATVEF specification content triggers to invoke a change of the content of the synchronization client 408 displayed in web page 407. Multicasting data to the synchronization client 408 renders polling of the personal web server 405 by the client device 406 unnecessary, which reduces the hardware requirements of client device 406.

Enhanced resources available to computer 400 from a digital television broadcast signal are also available to client device 406 through personal web server 405, as described in FIG. 2. The content displayed on the computer 400 and client device 406 is synchronized by synchronization server 412. In one embodiment, multiple client devices 406 are connected to computer 400. When an ATVEF specification content trigger is received by computer 400 through a DTV broadcast signal, all connected client devices 406 receive the same trigger and will have display content synchronized with the display of computer 400.

Figure 5:
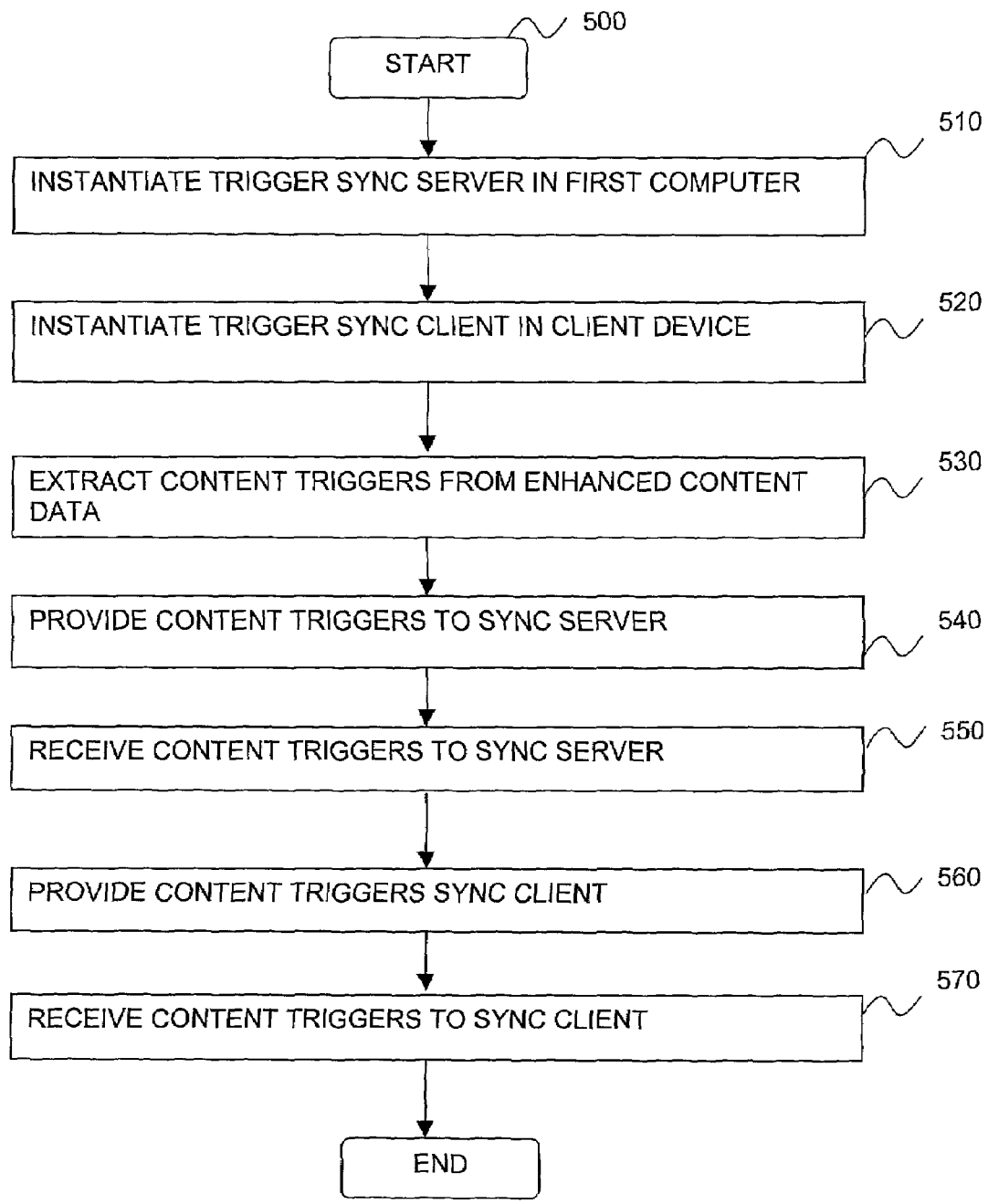
FIG. 5 is a diagram illustrating a process for enabling a PC-DTV receiver to synchronize the content of resources for multiple client devices.

FIG. 5 is a diagram illustrating a process for enabling a PC-DTV receiver to synchronize the content of resources for multiple client devices. Process 500 begins in step 510. A trigger synchronization server 412 is instantiated in computer 400 in step 510. Generally, the instantiation of synchronization server 412 accompanies the launch of computer 400's operating system, but may occur at any time. The synchronization server 412 is connected to an ATVEF receiver 402 though a data bus of the host computer 400.

In step 520, a trigger synchronization client 408 is instantiated in a personal web page 407 in a client device 406 when the web page 407 is loaded to the client device 406. The instantiation of synchronization client 408 may occur at any time after step 510 is complete. The synchronization client 408 is generally a script program, such as a java script, that requires minimal processing power and memory to run. The low demand for processing power and memory from the synchronization client 408 assures compatibility with a wide range of client devices 406. The synchronization client 408 is automatically loaded whenever a user navigates to the personal web page 407 hosted by the personal web server 405, which also contains the synchronization client 408 script. Generally, communication between the personal web server 405 and the client device is though a network connection using socket layer protocols.

In step 530, receiver ATVEF specification synchronization triggers 490 are extracted from a digital broadcast 120 received to a digital receiver 101 installed in a DTV enabled computer 400. Extraction of any ATVEF specification synchronization triggers 490 occurs automatically, according to the ATVEF specification standard whenever the ATVEF receiver 402 detects enhanced data embedded in a DTV broadcast signal 120 received to the computer 400. Synchronization triggers 490 generally invoke the execution of a script to change the content of a display, such the content of the synchronization client 408. A trigger 490 may also contain new data for display, such as the text on a banner for example. The ATVEF specification defines the content, form and method of extracting synchronization triggers 490 to provide enhanced content synchronized with broadcast programming.

In step 540, the synchronization triggers 490 are provided to a synchronization server 412. The synchronization server 412 is connected to the ATVEF receiver 402 though the data bus of computer 400. Synchronization triggers 490 appearing in the broadcast signal and extracted in step 530, are automatically routed to the synchronization server 412 by the ATVEF receiver 402.

In step 550, the synchronization server 412 receives the synchronization triggers 490. The synchronization server 412 is operative to cache the synchronization triggers 490 upon receipt. The synchronization server contains memory adequate to store all of the synchronization triggers 490 received during a television broadcast.

In step 560, the synchronization triggers 490 are provided to a synchronization client 408. The synchronization server 412 is operative to multicast the triggers 490 to predetermined port addresses. Multicasting is a form of network broadcasting, which requires only one set of packets for a multiplicity of clients or addresses.

In step 570, the synchronization client 408 receives the synchronization triggers 490 and executes any changes to the displayed content on the screen according to the triggers 490. Generally, the client device 406 is connected to a network connection and a synchronization client 408 has a network port designated to forward all packets appearing at the port after step 520 is completed. The triggers 490 are multicast and received as packets using a socket layer interface protocol such as TCP/IP.

Figure 6:
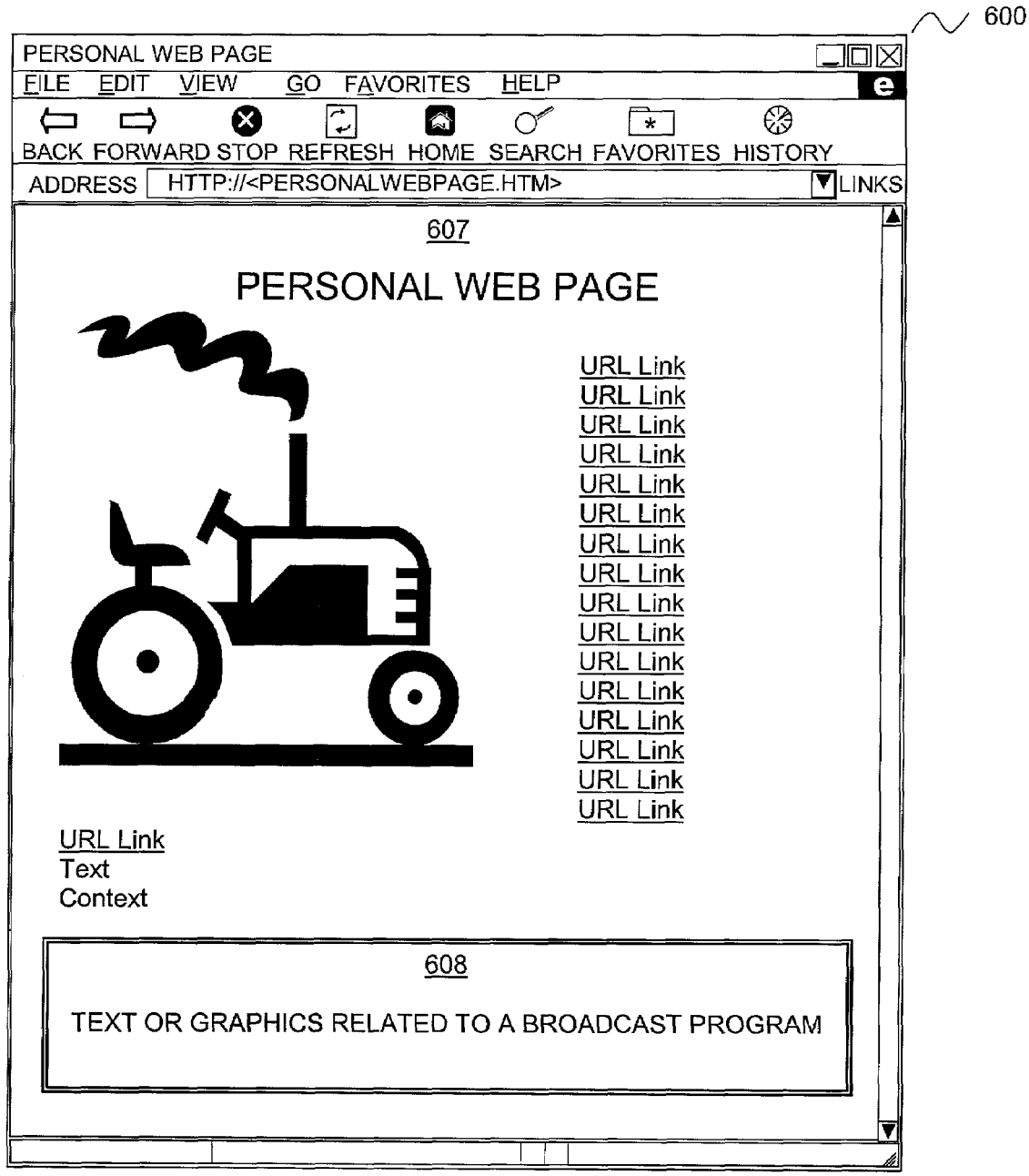
FIG. 6 illustrates a synchronization client in a personal web page in an embodiment of the invention.

FIG. 6 illustrates a synchronization client in a personal web page in an embodiment of the invention. FIG. 6 contains a depiction of a web browser 600 displaying a personal web page 607. Personal web page 607 may contain text, graphics URL links and other content. The personal web page 607 is hosted on a web server as in personal web server 405 of FIG. 4. Generally, the content of personal web page 607 will relate to enhanced data 140 broadcast with a television program 120 and received to a DTV-enabled personal computer 400. FIG. 6 depicts a trigger synchronization client 608 as an object in personal web page 607. Generally, the synchronization client 607 appears as a window in personal web page 607, and displays dynamic information such as text, graphics or hypertext links that are related to the context and context of a television program. ATVEF specification triggers 490 cause the content of the synchronization client 608 to change periodically, generally by activation of a script, as the triggers 490 are received 570 to the synchronization client 608. The synchronization client 608 may be a java script or any other script based program.

An example of the above system and method in a practical implementation follows. A personal computer such as depicted in FIG. 1 includes a DTV receiver for receiving and viewing digital television broadcasts. A user may watch television programming via the computer including enhanced content transmitted with the broadcast signal. For instance, the television program may be a news magazine with a feature on skin cancer. The enhanced content broadcast with the news program includes an Internet link to the National Institute of Health's most recent study of skin cancers, to a live chat room where viewers may address questions to a researcher or doctor in real-time, and other information links. The enhanced content is displayed in a window on the computer screen overlaid with the television program. By using function keys or a pointing device, the viewer may select from the various enhanced content options.

The computer user has a Personal Digital Assistant (PDA), which is connected to the computer through a high-speed wireless port. The PDA has a web browser and the user may download web pages, telephone numbers and appointments to the PDA from the personal computer. The user first navigates to a personal web page using the PDA. A personal web server in the personal computer hosts all of the enhanced content broadcast with the television program and received by the personal computer, and may provide the enhancements to other devices through a personal web page. The personal web page is located only on the personal web server, and is not an Internet accessed web page. However, the personal web server substitutes for a direct Internet connection for any number of client devices.

The PDA may additionally be used to dynamically display the enhanced content of the broadcast program received by the personal computer once it is initialized with the computer as a data synchronization client as depicted in FIG. 4. Once initialized, the synchronization client appears as a window in the personal web page with dynamically displayed content synchronized to the broadcast program and to the display of the personal computer. In the present example, such information could include book titles, telephone numbers for charitable organizations or information links about cancer research. The PDA is then useful to a television viewer that is enjoying a program from several feet away from the personal computer. The viewer is free to watch the television program and may use the PDA for viewing enhancements. Even though the PDA is not connected directly to the Internet, any pages available to the Internet browser cache of the computer are also available to the PDA. The PDA may therefore be used to view web pages and other information available on the personal computer as if the PDA was connected directly to the Internet. In order to have continuous dynamic synchronized content however, the user must be on the personal web page of the personal web server. A number of viewers may simultaneously access the enhanced content through connected client devices, allowing an entire audience to benefit from enhanced resources.

In a second example, a training seminar is in progress with a group of 50 trainees. An instructor utilizes a personal computer with a DTV receiver as depicted in FIG. 1 with a video projector so that all trainees can see the computer display. A digital television broadcast from headquarters is received by the computer and projected on a large screen. Each trainee has an interactive tablet device with a web browser that is connected to the personal computer thorough a network connection. While viewing the broadcast program the trainees are instructed to navigate to the personal web page to allow a synchronization client to be established on their tablet. Once established, the synchronization client appears as a window in the personal web page with content synchronized to the broadcast. As a speaker in the broadcast instructs the trainees on key element of the training, highlighted concepts and key words appear in the synchronization client window. During another part of the training session, links to special web pages are provided with the broadcast signal as enhancements. The website contains pages with interactive skill building exercises. The trainees are instructed to navigate to the website on their interactive tablets, the pages of which are stored in the web browser cache of the personal computer. Each trainee may utilize the interactive tablet to perform practice drills, without a direct Internet connection or a digital television receiver. Other broadcast enhancements that might be utilized in a training session include slides or voice messages.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
receiving a digital broadcast signal to a digital television receiver in a first computer, wherein the digital broadcast signal includes content and enhanced content data, and wherein the enhanced content data includes triggers and announcements to synchronize the digital broadcast signal content with content on a display;
processing the digital broadcast signal to extract the enhanced content data;
storing the enhanced content data in a web browser cache;
interrogating the web browser cache with an application programming interface;
providing the enhanced content data to a personal web server responsive to the application programming interface interrogating the web browser cache;
storing the enhanced content data in the personal web server; and
providing the enhanced content data stored in the personal web server to a client device via a personal web page hosted by the personal web server, wherein the personal web page is a home page for the personal web server, comprising:
loading the personal web page on the client device, wherein a synchronization client is created as an object window in the personal web page on the client device; and
updating the object window via the synchronization client when enhanced content data is received from a synchronization server in the first computer.

2. The method of claim 1 further comprising:
extracting content triggers from the enhanced content data; and
providing the content triggers to the synchronization client through a network.

3. The method of claim 2 wherein the personal web server is simultaneously providing enhanced content data stored in the personal web server to a plurality of client devices and the synchronization server is providing content triggers to at least one synchronization client.

4. The method of claim 3 wherein the client device is receiving the triggers wherein the content triggers update the synchronization client to be displaying information synchronized to the digital broadcast signal on the client device.

5. The method of claim 4 wherein the synchronization server is providing triggers to a network connection by multicasting datagram packets to sockets using a transmission protocol.

6. The method of claim 5 wherein the synchronization client is receiving the datagram packets provided by the synchronization server though a network connection.

7. The method of claim 1 wherein the client device is a second computer.

8. The method of claim 1 wherein the client device is an interactive tablet.

9. The method of claim 1 wherein the client device is a personal digital assistant.

10. A product, the product comprising:
instructions to direct a first processor to
receive a digital broadcast signal to a digital television receiver in a first computer, wherein the digital broadcast signal includes content and enhanced content data, and wherein the enhanced content data includes triggers and announcements to synchronize the digital broadcast signal content with content on a display,
process the digital broadcast signal to extract the enhanced content data,
store the enhanced content data in a web browser cache,
interrogate the web browser cache with an application programming interface from a personal web server,
provide the enhanced content data to the personal web server responsive to the application programming interface interrogating the web browser cache,
store the enhanced content data in the personal web server, and
provide the enhanced content data stored in the personal web server to a client device via a personal web page hosted by the personal web server, wherein the personal web rage is a home page for the personal web server, wherein the personal web page is loaded on the client device, wherein a synchronization client is created as an object window in the personal web page on the client device and wherein the object window is updated via the synchronization client when enhanced content data is received from a synchronization server in the first computer, and;
computer-readable medium to store the instructions.

11. The product of claim 10 further comprising:
instructions to direct the first processor to:
extract content triggers from the enhanced content data, and
provide the content triggers to the synchronization client, and; computer-readable medium to store the instructions.

12. The product of claim 11 wherein the instructions direct a personal web server to provide enhanced content data stored in the personal web server to a plurality of client devices while the synchronization server is simultaneously providing content triggers to at least one synchronization client.

13. The product of claim 12 wherein the client device is receiving the content triggers wherein the content triggers update the synchronization client to be displaying information synchronized to the digital broadcast signal on the client device.

14. The product of claim 13 wherein the synchronization server is providing content triggers to a network connection by multicasting datagram packets to sockets using a transmission protocol.

15. The product of claim 14 wherein the synchronization client is receiving the datagram packets provided by the synchronization server though a network connection.

16. The product of claim 10 wherein the client device is a second computer.

17. The product of claim 10 wherein the client device is an interactive tablet.

18. The product of claim 10 wherein the client device is a personal digital assistant.

19. The product of claim 10 wherein the client device is a remote control device with a display panel.

20. A system, the system comprising:
a first computer;
a digital television receiver installed in the first computer;
a client device communicably connected to the first computer through a network;
instructions to direct a processor to: receive a digital broadcast signal to a digital television receiver in a first computer, wherein the digital broadcast signal includes content and enhanced content data, and wherein the enhanced content data includes triggers and announcements to synchronize the digital broadcast signal content with content on a display, process the digital broadcast signal to extract the enhanced content data, store the enhanced content data in a web browser cache, interrogate the web browser cache with an application programming interface from a personal web server, provide the enhanced content data to the personal web server responsive to the API interrogating the web browser cache, store the enhanced content data in the personal web server, and provide the enhanced content stored in the personal web server to the client device via a personal web page hosted by the personal web server, wherein the personal web page is a home page for the personal web server, wherein the personal web page is loaded on the client device, wherein a synchronization client is created as an object window in the personal web page on the client device and wherein the object window is updated via the synchronization client when enhanced content data is received from a synchronization server in the first computer, and;

machine readable media to store the instructions.

21. The system of claim 20 wherein the instructions to direct a processor further include instructions to:

extract content triggers from the enhanced content data, provide the content triggers to the synchronization client, and;

machine readable media to store the instructions.

22. The system of claim 21 wherein the instructions direct a personal web server to provide enhanced content data stored in the personal web server to a plurality of client devices while the synchronization server is simultaneously providing the content triggers to at least one synchronization client.

23. The system of claim 22 wherein the client device is receiving the triggers wherein the content triggers update the synchronization client to be displaying content synchronized to the digital broadcast signal on the client device.

24. The system of claim 23 wherein the synchronization server is providing the content triggers to a network connection by multicasting datagram packets to sockets using a transmission protocol.

25. The system of claim 24 wherein the synchronization client is receiving the datagram packets provided by the synchronization server though a network connection.

26. The system of claim 20 wherein the client device is a second computer.

27. The system of claim 20 wherein the client device is an interactive tablet.

28. The system of claim 20 wherein the client device is a personal digital assistant.

29. The system of claim 20 wherein the client device is a remote control device with a display panel.

* * * * *